Patented Nov. 25, 1941

2,263,656

UNITED STATES PATENT OFFICE 2,263,656

PIGMENT

George F. A. Stutz, Palmerton, Pa., assignor to The New Jersey Zinc Company, New York, N. Y., a corporation of New Jersey No Drawing. Application January 13, 1939, Serial No. 250,769

15 Claims. (Cl. 134—78)

This invention relates to extender pigments, such as the sulphates and carbonates of barium and calcium, and particularly to extender pigments employed with zinc sulphide to form composite pigments, such for example, as lithopone. The invention aims to provide improvements to the end that such extender pigments, or composite pigments containing them, shall impart relatively high consistency or relatively high dry film hiding power or both to coating compositions, such as paints, in which the pigments are incorporated.

Composite zinc sulphide pigments may be formed by co-precipitation of the zinc sulphide and the extender, for example, by reacting barium sulphide with zinc sulphate to precipitate zinc sulphide and barium sulphate simultaneously, or such composite pigments may be prepared by forming the zinc sulphide and the extender separately and afterward mechanically mixing them. Irrespective of how the zinc sulphide and the extender become admixed, the zinc sulphide must be subjected to calcination followed by quenching (either in water or by a dry method of quenching) in order to improve its pigmentary properties. In case the zinc sulphide and the extender are co-precipitated, calcination of the former necessarily involves calcination of the latter. If the zinc sulphide and the extender are formed separately, the zinc sulphide may be calcined or quenched or both prior to admixture with the extender. If the zinc sulphide is calcined prior to admixture with the extender, the latter may, according to prior art practice, be separately calcined or not calcined at all.

During the operation of calcination, irrespective of whether the extender is present or not, the particles of crude precipitate (which are too small to have adequate hiding power) tend to increase in size and sinter together, particularly when substances such as chlorides, having a fluxing effect, are present. In the heretofore customary practice of calcining zinc sulphide pigments, such as lithopone, conditions of calcination (such as temperature, duration and proportion and character of fluxes) have been so adjusted as to bring the particles of zinc sulphide as nearly as possible to the size at which the hiding power of the product is at a maximum. However, heretofore customary forms of composite zinc sulphide pigments, such as lithopone, have tended to produce paints that possess relatively low consistency per unit of pigment and tend to lose hiding power upon drying. Attempts have been made to increase the ability of heretofore customary forms of lithopone to impart high consistency to paints containing them by "undermuffling," i. e., by carrying out calcination at a lower temperature or for a shorter time than is requisite to produce maximum hiding power. This expedient does not offer a satisfactory solution to the problem in view of the fact that an improvement in one pigmentary property (i. e., high consistency) is accompanied by loss in another (namely, hiding power).

As a result of my investigations, I have discovered that if inert pigments, such as barium sulphate, calcium sulphate and calcium carbonate, are calcined in the presence of a substance acting as an anti-flux and containing phosphate radical, an improved pigment is formed which overcomes the aforementioned difficulties and permits the production of a paint that has a high consistency and does not lose hiding power upon drying. The pigment resulting from such treatment comprises porous particles containing a relatively small proportion of phosphate radical, preferably in the form of a relatively infusible phosphate, such as, for example, a phosphate of calcium, barium or aluminum, and is of especial utility in preparing composite zinc sulphide pigments in which the particles of zinc sulphide are of such size as to insure maximum hiding power without sacrifice of high consistency in the paint or loss of hiding power upon drying.

The porous phosphate-radical-containing pigments of my invention are preferentially wetted by many of the customary volatile vehicles or thinners such as turpentine, and the high dry film hiding power of paint containing such pigments can be ascribed both to the presence of the voids existing in the pigment particles themselves and to the action of the volatile thinners which preferentially wet the pigment particles and thus form zones around said particles in which the volatile thinner is concentrated. Evaporation of the thinner from these zones forms additional voids or pores, which with the voids in the pigment particles themselves, bring about an increase in the hiding power of the dry film without appreciably weakening the dry film mechanically.

The relatively high consistency which the pigment imparts to paint in which it is incorporated also appears to be due, at least in part, to the porous nature of the pigment particles.

Accordingly, my invention contemplates the calcination of an extender pigment selected from the group consisting of the sulphates of barium and calcium and calcium carbonate (either separately or together with crude zinc sulphide) in the presence of a substance acting as an antiflux and containing phosphate radical; an improved pigment comprising an extender selected from said group (and either with or without zinc sulphide) the particles of said pigment being porous and containing intimately associated phosphate radical; and a paint in which the improved pigment is incorporated together with a non-volatile vehicle and a volatile thinner which wets the pigment particles preferentially, i. e., to a greater degree than does the non-volatile vehicle.

Suitable substances that act as antifluxes during calcination of the pigments are pyrophosphoric acid, metaphosphoric acid and orthophosphoric acid. Alkali metal phosphates, such as, for example, normal sodium orthophosphate ($Na_3PO_4$) and sodium acid orthophosphates ($Na_2HPO_4$ and $NaH_2PO_4$) are also effective phosphate-radical-containing antifluxes. Other substances having an antifluxing effect may also be employed in addition to the phosphate-containing antiflux. Thus, aluminum sulphate or sodium silicate or both may be added with antifluxes containing phosphate radical to the pigment to be calcined.

If fluxes (such as chlorine or alkali metal radicals) are present in the pigment subjected to calcination, the effect of such fluxes must be overcome by an appropriate increase in the proportion of antiflux present. In particular, when alkali metal phosphates are used to introduce a phosphate radical into the extender pigment, an additional proportion of antiflux should be employed, which additional antiflux may be phosphate radical or phosphate radical plus other antifluxing agents such as aluminum sulphate or sodium silicate. For this same reason, when sodium silicate is used as an antiflux, it is desirable to use material as low in $Na_2O$ as is possible with retention of water solubility. The ratio of $SiO_2$ to $Na_2O$ should be 3.5 to 1 or higher.

The proportion of phosphate-radical-containing agent to be employed may vary from about 0.25% to about 1.5% of the dry weight of the extender pigment being calcined. When the extender is calcined in situ in a composite zinc sulphide pigment such as lithopone, my presently preferred practice is to employ said agent in about the same numerical proportions but calculated on the dry weight of the total pigment present. Small proportions of additional substances having an antifluxing effect, such as 0.13% of aluminum as aluminum sulphate and 0.25% of sodium silicate (the percentages being calculated upon the weight of the dry pigment) may also be added.

The proportions to be used in practice, particularly the proportion of substance containing a phosphate radical, should be varied roughly in direct ratio to the proportion of fluxing agents present in the pigment to be treated. Particularly desirable results are obtained, in the treatment of lithopone, if the substance containing phosphate radical constitutes about 0.5% by weight of the dry pigment and fluxing agents such as sodium or chloride radicals are present in such minor proportions that this proportion of phosphate radical is sufficient to overcome any fluxing effects of such agents.

The phosphate radical added to the pigment is for the most part retained thereby during the calcining operation, so that substantially all of it is present in the finished pigment.

When extender pigments such as calcium sulphate, barium sulphate and calcium carbonate are separately calcined in accordance with my invention, calcination at a temperature of 700° C. for 15 minutes followed by quenching and grinding generally produces optimum results.

When crude lithopone is treated by the method of the invention, calcination may be carried out at the usual temperature at which lithopone is calcined, say 800° C. for a time sufficient to bring the lithopone to or in the neighborhood of its maximum tinting strength. "Quenching" of the pigment may be conducted by either wet or dry procedures, and thereafter the pigment is subjected to conventional finishing steps, including grinding. The finished lithopone will appear to be "under-muffled," i. e., calcined at too low a temperature, on account of its ability to form high consistency paints. This "under-muffled" quality is, however, for the most part only apparent, because lithopone prepared in accordance with this embodiment of the invention has a satisfactory hiding power, relatively high in comparison with the hiding power of conventional lithopone that has been undermuffled in order to obtain high consistency.

The following examples illustrate presently preferred practices of my invention:

I. *Treatment of extender in presence of zinc sulphide*

Into an aqueous slurry of crude co-precipitated lithopone containing equi-molecular proportions of barium sulphate and zinc sulphide, there are incorporated 0.13% of aluminum as aluminum sulphate, 0.25% sodium silicate and 0.54% phosphoric acid, the percentages being calculated on the weight of the dry lithopone. Thereafter, the slurry is alkalized to a pH of about 8.5 by addition of barium sulphide solution. As a result of the alkalization, aluminum silicate, aluminum phosphate, barium silicate and barium phosphate are precipitated and become incorporated, as by adsorption, in the crude pigment particles.

Thereafter the slurry is de-watered, and calcined at about 800° C. for about 60 minutes. During the calcination, the coatings of precipitates adsorbed by the pigment act as antifluxes and result in the formation of porous particles.

The calcined lithopone is subjected to quenching, grinding and other conventional finishing treatments, and the finished material forms paints of high consistency that possess satisfactory hiding power in the wet state and relatively higher hiding power in the dry state than do paints of comparable formulation prepared from ordinary lithopone that has been undermuffled in order to obtain high consistency.

II. *Treatment of extender pigment separately*

An aqueous slurry containing a crude precipitate of one or more compounds selected from the group consisting of barium sulphate, calcium sulphate and calcium carbonate, which slurry is substantially free of fluxing agents, is treated by dissolving in it 0.25% aluminum as aluminum sulphate, 0.50% sodium silicate and 0.25% phosphoric acid, the percentages being calculated on the weight of the dry precipitate. The slurry is then alkalized to a pH of 8.5. In the case of barium sulphate precipitate, barium hydrate is employed as an alkalization agent. In the case of calcium compounds, calcium hydrate is used. The alkalized slurry is dewatered and calcined at about 700° C. for about 15 minutes.

In the following examples, the calcined product was then mixed with zinc sulphide which had been calcined separately, and thereafter subjected to customary finishing treatment. For purposes of comparison, identical precipitates were subjected to identical treatment except that the extenders were calcined in the absence of the antifluxes. The pigments in all cases were mixed in identical proportions in a standard vehicle (which was a limed rosin-bodied linseed oil type flat wall liquid) and subjected to tests to determine relative wet and dry film hiding power and relative consistency. The comparative results are given in the following table, the even numbered samples (designated "antifluxed") being those prepared in accordance with the invention, and the odd numbered samples being those which were not subjected to the phosphate treatment.

| Sample No. | Pigment | Relative hiding power | | Consistency index |
|---|---|---|---|---|
| | | Wet | Dry | |
| 1 | 30% zinc sulphide, 70% CaSO₄ | 252 | 269 | 15.4 |
| 2 | 30% zinc sulphide, 70% CaSO₄ (antifluxed) | 252 | 320 | 115.8 |
| 3 | 30% zinc sulphide, 70% BaSO₄ | 260 | 222 | 4.0 |
| 4 | 30% zinc sulphide, 70% BaSO₄ (antifluxed) | 262 | 292 | 10.2 |
| 5 | 30% zinc sulphide, 70% CaCO₃ | 238 | 236 | 10.6 |
| 6 | 30% zinc sulphide, 70% CaCO₃ (antifluxed) | 240 | 255 | 19.0 |

Comparison of the data in the foregoing table illustrates the advantages accruing to the practice of the invention, in that in all cases where the extender was calcined in the presence of anti-flux containing phosphate radical, the paint containing such extender had an adequate wet film hiding power which increased greatly upon drying and also possessed a much higher consistency than did other paint which was similar in all respects except that its extender content had not been subjected to calcination in the presence of a phosphate-containing antiflux.

I claim:

1. An extender pigment selected from the group consisting of barium sulfate, calcium sulfate and calcium carbonate and consisting of porous calcined particles of a substance selected from said group, which particles are substantially free of fluxes and contain phosphate radical added prior to calcination, the phosphate being present in proportions ranging from about .25% to 1.5% of the dry weight of the pigment.

2. An extender pigment consisting of porous particles of a substance selected from the group consisting of barium sulfate, calcium sulfate and calcium carbonate containing a flux and an antiflux including water-insoluble phosphate adsorbed by and calcined in situ in the particles, the antiflux content of the particles being present in proportions in excess of that necessary to overcome the fluxing effect of the flux present in the particles.

3. An extender pigment consisting of porous calcined particles of a pigment selected from the group consisting of barium sulfate, calcium sulfate and calcium carbonate, which particles contain a flux and a relatively infusible phosphate of a metal selected from the group consisting of calcium and barium in the presence of which the particles have been calcined, phosphate radical being adsorbed by the particles in proportions in excess of that necessary to overcome the fluxing effect of the flux present therein during calcination.

4. A composite pigment containing zinc sulfide and an extender selected from the group consisting of barium sulfate, calcium sulfate and calcium carbonate, the particles of extender being porous and containing a flux and a water-insoluble phosphate calcined in situ, phosphate radical being present in and adsorbed by the particles in excess of that required to overcome the fluxing effect of the flux present therein during calcination.

5. An extender pigment consisting of porous particles of a pigment selected from the group consisting of barium sulfate, calcium sulfate and calcium carbonate, which particles contain a small proportion of a flux and adsorbed phosphate radical calcined in situ therein, said proportion being in excess of that necessary to overcome the fluxing effect of the flux present in the particles during calcination.

6. A coating composition of high consistency per unit of pigment and containing an extender pigment consisting of calcined porous particles of a substance selected from the group consisting of barium sulfate, calcium sulfate and calcium carbonate, which particles contain a flux and adsorbed phosphate radical in excess of that required to overcome the fluxing effect of the flux present during calcination, said composition also containing a non-volatile vehicle and a volatile thinner that wets said porous particles preferentially.

7. A coating composition of high consistency and high dry film hiding power comprising a composite pigment containing zinc sulfide and porous particles of an extender selected from the group consisting of barium sulfate, calcium sulfate and calcium carbonate, which particles contain a flux and phosphate selected from the group consisting of barium and calcium phosphate calcined therein, phosphate radical being present in the particles in excess of that necessary to counteract the fluxing effect of the flux present in the particles during calcination, said composition also containing a non-volatile vehicle and a volatile vehicle that wets said porous particles preferentially.

8. In the manufacture of a pigment selected from the group consisting of barium sulfate, calcium sulfate and calcium carbonate, the improvement which comprises calcining said pigment in the presence of a flux and an antiflux including phosphate radical adsorbed by the pigment until the particles thereof become porous, the proportion of antiflux present being in excess of that necessary to counteract the fluxing effect of the flux present.

9. In the manufacture of a pigment selected from the group consisting of barium sulfate, calcium sulfate and calcium carbonate, the improvement which comprises calcining said pigment while the particles thereof contain a flux and have thereon an antiflux selected from the group consisting of barium phosphate and calcium phosphate until the particles become porous, the proportion of antiflux present in the particles during calcination being in excess of that required to overcome the fluxing effect of the flux present.

10. In the manufacture of a pigment selected from the group consisting of barium sulfate, calcium sulfate and calcium carbonate, the improvement which comprises adding to an aqueous slurry of the pigment a water-soluble antiflux containing phosphate radical in proportions ranging from about .25% to about 1.5% of the dry weight of the pigment, precipitating a water-insoluble phosphate of the group consisting of calcium phosphate and barium phosphate upon the surfaces of the particles of pigment in the slurry, and thereafter subjecting the resulting phosphate-coated particles to calcination until the particles become porous, the particles subjected to calcination being substantially free of fluxes.

11. In the manufacture of a pigment selected from the group consisting of barium sulfate, calcium sulfate and calcium carbonate, the improvement which comprises calcining said pigment while an antiflux containing a phosphate radical is adsorbed thereon and while the pigment is substantially free of fluxing agents, said antiflux being present in proportions ranging from about 0.25 per cent to 1.5 per cent of the dry weight of the pigment, and the calcination being conducted for such a period and at such a temperature that the particles become porous.

12. In the manufacture of a composite pigment containing zinc sulfide and an extender selected from the group consisting of barium sulfate, calcium sulfate and calcium carbonate, the improvement which comprises adding to an aqueous slurry containing the extender pigment a reagent selected from the group of orthophosphoric acid, metaphosphoric acid, pyrophosphoric acid and alkali metal salts of said acids, alkalizing said slurry with a water-soluble alkaline compound of a metal selected from the group consisting of barium and calcium to cause precipitation of phosphates on the extender particles, and thereafter calcining the extender in the presence of a flux and of the precipitated phosphates until the particles of extender become porous, the proportion of antifluxes including phosphate radical present during calcination being in excess of that necessary to counteract the fluxing effect of the flux present.

13. In the manufacture of a composite pigment containing zinc sulfide and an extender selected from the group consisting of barium sulfate, calcium sulfate and calcium carbonate, the improvement which comprises adding to an aqueous slurry containing the extender and a flux aluminum sulfate and an antiflux forming reagent selected from the group consisting of orthophosphoric, metaphosphoric, pyrophosphoric acids and alkali metal salts of said acids, forming a phosphate precipitate on the particles of the extender by incorporating a water-soluble alkaline reagent in the slurry, the proportion of antiflux thus incorporated in the extender being in excess of that necessary to counteract the fluxing effect of the flux present in the extender and thereafter calcining the extender in the presence of the antifluxes and of the flux until the particles of extender become porous.

14. In the manufacture of a pigment selected from the group consisting of barium sulfate, calcium sulfate and calcium carbonate, the improvement which comprises precipitating and adsorbing upon particles of the pigment suspended in an aqueous slurry a water-insoluble phosphate selected from the group consisting of barium phosphate and calcium phosphate, and thereafter subjecting the particles to calcination in the presence of the adsorbed phosphate precipitate and of a flux, antifluxes including the phosphate being present in the pigment during calcination in proportions in excess of that necessary to overcome the fluxing effect of the flux present and the calcination being conducted until the particles become porous.

15. In the manufacture of a pigment selected from the group consisting of barium sulfate, calcium sulfate and calcium carbonate, the improvement which comprises adsorbing on particles of pigment an antiflux containing phosphate radical, and thereafter calcining said pigment in the presence of the antiflux and a flux until the pigment particles become porous, the antiflux thus incorporated being present in proportions in excess of that necessary to counteract the fluxing effect of the flux present in the pigment.

GEORGE F. A. STUTZ.